US009239247B1

(12) United States Patent
Angus et al.

(10) Patent No.: US 9,239,247 B1
(45) Date of Patent: Jan. 19, 2016

(54) VERIFICATION OF DEVICES CONNECTED TO AIRCRAFT DATA PROCESSING SYSTEMS

(75) Inventors: Ian Gareth Angus, Mercer Island, WA (US); Steven Craig Venema, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 221 days.

(21) Appl. No.: 13/246,610

(22) Filed: Sep. 27, 2011

(51) Int. Cl.
*G01C 23/00* (2006.01)

(52) U.S. Cl.
CPC ..................................... *G01C 23/00* (2013.01)

(58) Field of Classification Search
CPC ......... G06F 1/1613; G06F 8/70; G06F 9/445; G06F 9/44; G06F 17/30
USPC ......................................................... 717/171
See application file for complete search history.

(56) References Cited

U.S. PATENT DOCUMENTS

| | | | |
|---|---|---|---|
| 5,522,026 A | 5/1996 | Records et al. | |
| 6,671,589 B2 * | 12/2003 | Holst et al. ........................ | 701/3 |
| 6,868,319 B2 | 3/2005 | Kipersztok et al. | |
| 7,840,812 B1 | 11/2010 | Levenberg | |
| 8,132,233 B2 | 3/2012 | Gronholm et al. | |
| 8,136,157 B2 | 3/2012 | Koyasu et al. | |
| 8,286,174 B1 | 10/2012 | Schmidt et al. | |
| 8,341,747 B2 | 12/2012 | Cornwall et al. | |
| 8,458,695 B2 | 6/2013 | Fitzgerald et al. | |
| 8,522,237 B2 | 8/2013 | Hotra | |
| 8,572,613 B1 | 10/2013 | Brandwine | |
| 8,589,020 B1 | 11/2013 | Angus et al. | |
| 8,615,384 B2 | 12/2013 | Angus et al. | |
| 2003/0187878 A1 | 10/2003 | Sandifer | |
| 2006/0020782 A1 | 1/2006 | Kakii | |
| 2006/0080497 A1 | 4/2006 | Boning | |
| 2006/0080519 A1 | 4/2006 | Boning | |
| 2006/0090053 A1 | 4/2006 | Boning | |
| 2006/0106836 A1 | 5/2006 | Masugi et al. | |
| 2006/0112246 A1 | 5/2006 | Boning | |
| 2006/0229772 A1 * | 10/2006 | McClary ............................ | 701/3 |
| 2009/0077626 A1 | 3/2009 | Leclercq et al. | |
| 2009/0138516 A1 * | 5/2009 | Young et al. ................ | 707/104.1 |
| 2009/0138872 A1 | 5/2009 | Fuchs et al. | |
| 2009/0138873 A1 * | 5/2009 | Beck et al. ..................... | 717/173 |
| 2009/0138874 A1 | 5/2009 | Beck et al. | |
| 2009/0150022 A1 | 6/2009 | McMillin et al. | |

(Continued)

OTHER PUBLICATIONS

U.S. Appl. No. 13/271,871, filed Oct. 12, 2011, Angus et al.

(Continued)

*Primary Examiner* — Helal A Algahaim
*Assistant Examiner* — Michael Fouche
(74) *Attorney, Agent, or Firm* — Yee & Associates, P.C.

(57) ABSTRACT

A system and method for allowing access to an aircraft network data processing system on an aircraft. A data processing device receives an expected measurement of software on the data processing device. The expected measurement is generated by a device other than the data processing device. The data processing device identifies an actual measurement of the software on the data processing device. The data processing device is connected to the aircraft network data processing system on an aircraft. The expected measurement and the actual measurement are sent from the data processing device to the aircraft network data processing system to determine whether the data processing device is allowed to access the aircraft network data processing system. The data processing device accesses the aircraft network data processing system in response to a determination that the data processing device is allowed to access the aircraft network data processing system.

16 Claims, 6 Drawing Sheets

(56) References Cited

U.S. PATENT DOCUMENTS

| | | | |
|---|---|---|---|
| 2009/0187976 A1 | 7/2009 | Perroud et al. | |
| 2009/0198393 A1* | 8/2009 | Sims et al. | 701/3 |
| 2010/0100887 A1 | 4/2010 | Beltrand | |
| 2010/0122343 A1 | 5/2010 | Ghosh et al. | |
| 2010/0161805 A1 | 6/2010 | Yoshizawa et al. | |
| 2010/0199129 A1 | 8/2010 | Kitani | |
| 2010/0299742 A1 | 11/2010 | Declety et al. | |
| 2011/0004676 A1 | 1/2011 | Kawato | |
| 2011/0066879 A1 | 3/2011 | Nakai | |
| 2011/0071709 A1 | 3/2011 | Damiani et al. | |
| 2011/0173605 A1 | 7/2011 | Bourne | |
| 2011/0219373 A1 | 9/2011 | Nam et al. | |
| 2011/0238239 A1 | 9/2011 | Shuler et al. | |
| 2012/0131637 A1 | 5/2012 | Lum et al. | |
| 2012/0246698 A1 | 9/2012 | Lum et al. | |
| 2012/0254937 A1 | 10/2012 | Lum et al. | |
| 2012/0254938 A1 | 10/2012 | Lum et al. | |
| 2012/0254939 A1 | 10/2012 | Lum et al. | |
| 2013/0031543 A1 | 1/2013 | Angus et al. | |
| 2013/0261853 A1 | 10/2013 | Shue et al. | |
| 2013/0305391 A1 | 11/2013 | Haukom et al. | |

OTHER PUBLICATIONS

U.S. Appl. No. 13/306,528, filed Nov. 29, 2011, Angus et al.

"TCG Trusted Network Connect TNC Architecture for Interoperability", Trusted Computing Group Incorporated, Specification V. 1.4, Rev. 4, May 2009, 45 pages.

"HAP Technology Overview: Trusted Computing Technologies Used in the High Assurance Platform", National Security Agency/Central Security Service, Jan. 2011, 1 page.

Non-final office action dated Mar. 1, 2013 regarding U.S. Appl. No. 13/306,528, 19 pages.

Notice of allowance dated Feb. 21, 2014 regarding U.S. Appl. No. 13/190,184, 24 pages.

Notice of allowance dated Jul. 31, 2013 regarding U.S. Appl. No. 13/306,528, 12 pages.

Non-final office action dated Dec. 16, 2013 regarding U.S. Appl. No. 13/190,184, 31 pages.

Non-final office action dated Oct. 22, 2013 regarding U.S. Appl. No. 13/271,871, 23 pages.

Notice of allowance dated Dec. 16, 2013 regarding U.S. Appl. No. 13/271,871, 8 pages.

Combined Search and Examination Report, dated Oct. 24, 2012, regarding Application No. GB1211743.8, 6 pages.

Subar, "Mobile virtualization finds its home in the enterprise," Tech News and Analsyis, Jun. 25, 2011, 13 pages.

"What is Mobile Virtualization?," Open Kernal Labs, 2 pages. http://www.ok-labs.com/solutions/what-is-mobile-phone-virtualization, Jan. 13, 2014.

UK examination report dated Nov. 7, 2013 regarding application GB1211743.8, reference NAMM/P123215GB00, applicant The Boeing Company, 4 pages.

* cited by examiner

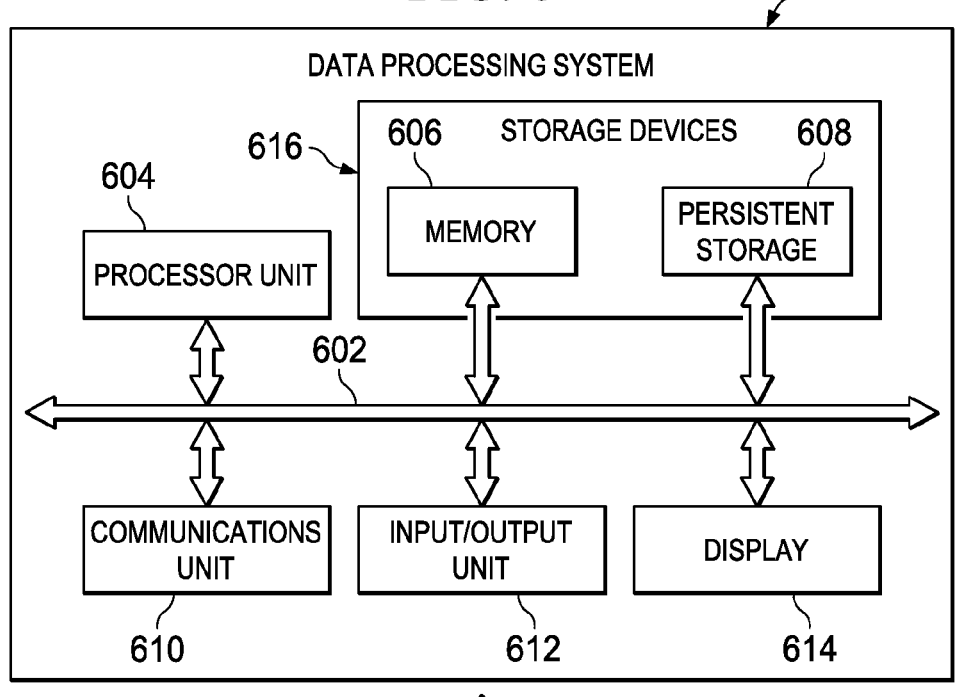
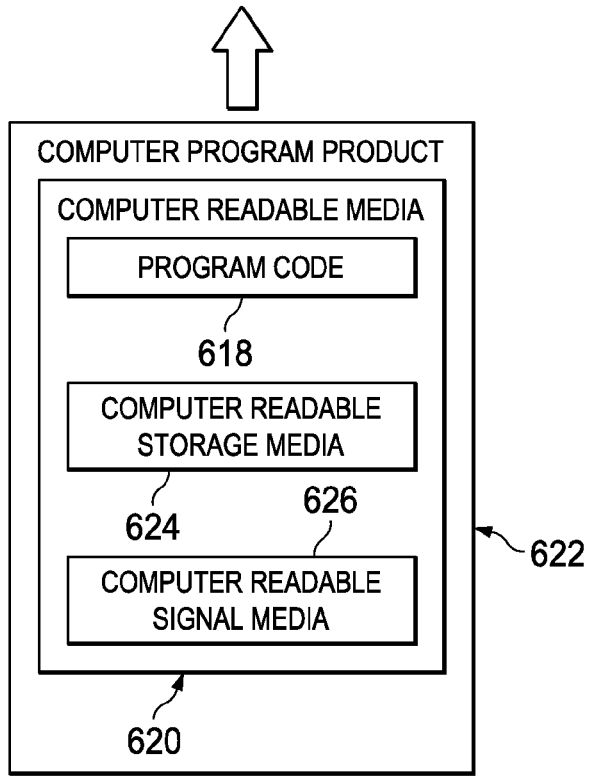
FIG. 6

VERIFICATION OF DEVICES CONNECTED TO AIRCRAFT DATA PROCESSING SYSTEMS

BACKGROUND INFORMATION

1. Field

The present disclosure relates generally to verifying the integrity of devices, such as maintenance devices, connected to data processing systems on aircraft. Still more particularly, the present disclosure relates to verifying the integrity of such devices based on the configuration of the software on the devices, and where the configuration is not known by the data processing systems on the aircraft.

2. Background

Modern aircraft are extremely complex. For example, an aircraft may have many types of electronic systems on-board. These systems are often in the form of line-replaceable units (LRUs). A line-replaceable unit is an item that can be removed and replaced from an aircraft. A line-replaceable unit is designed to be easily replaceable.

A line-replaceable unit may take on various forms. A line-replaceable unit on an aircraft may be, for example, without limitation, a flight management system, an autopilot, an in-flight entertainment system, a communications system, a navigation system, a flight controller, a flight recorder, a collision avoidance system, a system to support maintenance functions, or a system to support crew processes. The various line-replaceable units on an aircraft may be parts of an aircraft network data processing system.

Line-replaceable units may use software or programming to provide the logic or control for various operations and functions. Typically, all software on an aircraft is treated as a separate part, or is combined with a hardware part and is unchangeable without changing the hardware part number. Aircraft software that is treated as an aircraft part may be referred to as a loadable software aircraft part or a software aircraft part. Software aircraft parts are parts of an aircraft's configuration.

Aircraft operators are entities that operate aircraft. Aircraft operators also may be responsible for the maintenance and repair of aircraft. Examples of aircraft operators include airlines and military units. When an aircraft operator receives an aircraft, software aircraft parts may be already installed in the line-replaceable units on the aircraft.

An aircraft operator may also receive copies of loaded software aircraft parts in case the parts need to be reinstalled or reloaded into the line-replaceable units on the aircraft. Reloading of software aircraft parts may be required, for example, if a line-replaceable unit in which the software is used is replaced or repaired. Further, the aircraft operator also may receive updates to the software aircraft parts from time to time. These updates may include additional features not present in the currently-installed software aircraft parts and may be considered upgrades to one or more line-replaceable units. Specified procedures may be followed during loading of a software aircraft part on an aircraft so that the current configuration of the aircraft, including all of the software aircraft parts loaded on the aircraft, is known.

An aircraft operator or other aircraft maintenance entity may perform maintenance operations on an aircraft. Some maintenance operations may be performed by connecting a maintenance device to the aircraft network data processing system. For example, the maintenance device may be a portable computing device, such as a laptop computer.

The maintenance device may include software stored on the device that is used to perform various maintenance operations on the aircraft. The maintenance device also may include other software stored on the device. It is desired that only maintenance devices from approved maintenance entities, including only approved software from trusted software suppliers, be allowed to access the aircraft network data processing system. For example, unapproved software on a maintenance device may include software that is corrupted, software that is infected with a virus, or other unapproved software. Unapproved software may affect the operation of the aircraft network data processing system in undesired ways if a maintenance device containing such software is allowed to access the aircraft network data processing system.

Systems and methods for providing network access control to ground-based computer networks are known. One solution that enables network operators to determine whether to grant access to a requested network infrastructure is defined by the architecture and standards for Trusted Network Connect (TNC) developed by the Trusted Computing Group (TCG). One aspect of the Trusted Network Connect solution for network access control is the use of a Trusted Platform Module (TPM). The Trusted Platform Module is a hardware security component that is currently included in many laptop and desktop computers. In the Trusted Network Connect architecture, the Trusted Platform Module is primarily used for remote attestation. During the boot sequence of a device to be connected to a network, the software and firmware components of the device are measured. Additional measurements may be made after the device is booted. The measurements may be made using a number of hash functions. The measurements are stored securely in the Trusted Platform Module. During a Trusted Network Connect handshake, these measurements are sent to a Trusted Network Connect server, where they are compared against the values for proper configurations. If the values do not match, the device may be infected and may be refused access to the network or quarantined.

Current systems and methods for network access control to entirely ground-based computer networks may not be applied effectively to mobile systems, such as aircraft. The particular environment in which network data processing systems on aircraft are operated and maintained makes it difficult or impossible to use such current network access control systems and methods for verifying the integrity of maintenance devices or other devices connected to an aircraft network data processing system. This is due partly to the fact that aircraft are often disconnected from back office networks and partly to the conventions for aircraft configuration control that are followed in aircraft maintenance operations.

Accordingly, it would be advantageous to have a method and apparatus that takes into account one or more of the issues discussed above, as well as possibly other issues.

SUMMARY

An embodiment of the present disclosure provides a method for accessing an aircraft network data processing system. A data processing device receives an expected measurement of software on the data processing device. The expected measurement is generated by a device other than the data processing device. The data processing device identifies an actual measurement of the software on the data processing device. The data processing device is connected to the aircraft network data processing system on an aircraft. The expected measurement and the actual measurement are sent from the data processing device to the aircraft network data processing system to determine whether the data processing device is allowed to access the aircraft network data processing system. The data processing device accesses the aircraft network data processing system in response to a determination that the data processing device is allowed to access the aircraft network data processing system.

Another embodiment of the present disclosure provides a method for allowing access to an aircraft network data processing system. The aircraft network data processing system on an aircraft receives an expected measurement of software on a data processing device from the data processing device. The expected measurement is generated by a device other than the data processing device. The aircraft network data processing system also receives an actual measurement of the software on the data processing device from the data processing device. The actual measurement is generated by the data processing device. The aircraft network data processing system on the aircraft compares the expected measurement to the actual measurement and allows the data processing device to access the aircraft network data processing system responsive to a determination that the expected measurement matches the actual measurement.

Another embodiment of the present disclosure provides an apparatus comprising an interface, software, a measurement module, and a processor unit. The interface is configured to connect the apparatus to an aircraft network data processing system on an aircraft. The software is stored on the apparatus. The measurement module is configured to identify an actual measurement of the software stored on the apparatus. The processor unit is configured to receive an expected measurement of the software stored on the apparatus, to send the expected measurement and the actual measurement from the apparatus to the aircraft network data processing system to determine whether the apparatus is allowed to access the aircraft network data processing system, and to access the aircraft network data processing system responsive to a determination that the apparatus is allowed to access the aircraft network data processing system. The expected measurement is generated by a device other than the apparatus.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of advantageous embodiments of the present disclosure when read in conjunction with the accompanying drawings, wherein:

FIG. 6 is an illustration of a data processing system in accordance with an advantageous embodiment.

DETAILED DESCRIPTION

Figure 1:
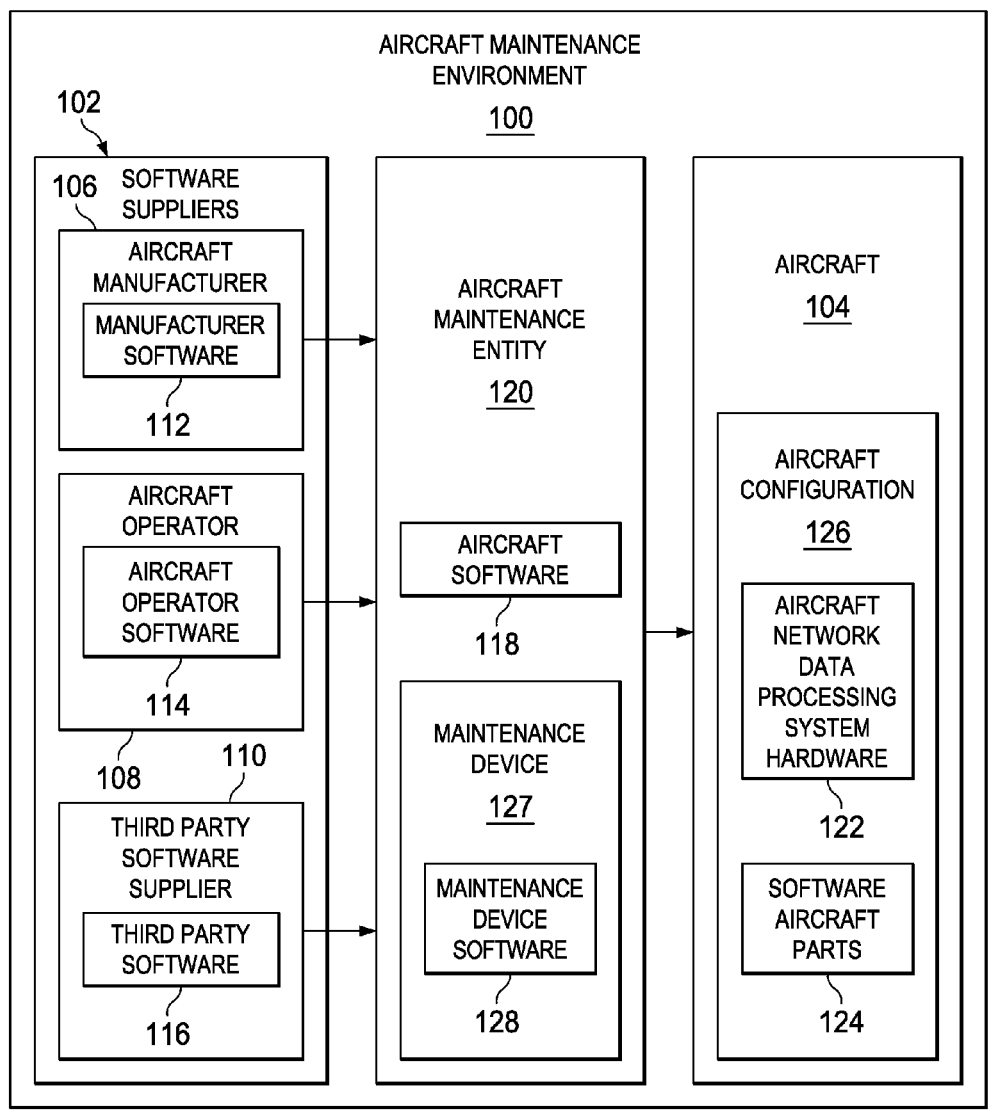
FIG. 1 is an illustration of a block diagram of an aircraft maintenance environment for maintaining an aircraft in accordance with an advantageous embodiment.

The different advantageous embodiments recognize and take into account a number of different considerations. "A number", as used herein with reference to items, means one or more items. For example, "a number of different considerations" means one or more different considerations.

The different advantageous embodiments recognize and take into account that the configuration of software in a device connected to a data processing system on an aircraft may be used to determine whether or not the device is allowed to access the data processing system on the aircraft. For example, the software on a maintenance device connected to a network data processing system on an aircraft may be used to determine whether the maintenance device is allowed to access the aircraft network data processing system. An actual measurement of the software on the maintenance device or other device may be identified using, for example, one or more hash functions or other functions in various combinations applied to the software stored on the device. The actual measurement may be compared to an expected measurement to determine whether or not the device is allowed to access the data processing system on the aircraft. The comparison of the actual measurement to the expected measurement may be performed by the data processing system on the aircraft.

The different advantageous embodiments also recognize and take into account that an aircraft operator or other maintenance entity may update the software on a maintenance device or other device to be connected to the data processing system on an aircraft. The aircraft operator may update the software on the maintenance device often and for various reasons. The aircraft operator may update the software on the maintenance device with software from a trusted source. A maintenance device with updated software from a trusted source should be allowed to access the data processing system on an aircraft.

The different advantageous embodiments also recognize and take into account that updates to the software on the maintenance device will change the value of the actual measurement of the software on the device. If the expected measurement used by the data processing system on the aircraft does not reflect the latest updates to the software on the data processing device, then the expected measurement will not match the actual measurement. In this case, a maintenance device or other device connected to a network data processing system on an aircraft may not be allowed to access the network, even though the updates to the software on the device are approved software from trusted sources.

The different advantageous embodiments recognize and take into account that the environment in which the network data processing system on an aircraft is operated and maintained may make it difficult for a data processing system on the aircraft to obtain and store the latest expected measurements of software, including the latest updates, on data processing devices that may request access to the aircraft network data processing system. For example, network data processing systems on mobile platforms, such as aircraft, are often disconnected from access to other computer networks. Therefore, a data processing system on an aircraft may not be able to obtain the latest expected measurement of software on a device requesting access to the aircraft network data processing system directly from a trusted third party via a network connection when needed.

The different advantageous embodiments also recognize and take into account that the latest expected measurement of software on a device may be loaded onto the aircraft and stored in the aircraft network data processing system each time the software on the device is updated. However, new expected measurements that are loaded and stored on an aircraft may be subject to the procedures that are followed during loading of a software aircraft part on an aircraft so that the current configuration of the aircraft is always known. It may be unwieldy and inefficient to update the configuration of an aircraft in this manner for every software update to any device that may legitimately request access to the network data processing system on the aircraft.

Thus, one or more of the advantageous embodiments provides a system and method for determining whether a maintenance device or other data processing device is allowed to access the network data processing system on an aircraft. In accordance with an advantageous embodiment, both an actual measurement of the software on the device and an expected measurement of the software on the device are provided from the data processing device to a data processing system on the aircraft when the device requests access to the aircraft network data processing system. Therefore, the data processing system on the aircraft need not have prior knowledge of the expected measurement of the software on the device, or immediate access to a third party source of such information, in order to determine whether or not the device should be allowed to access the network data processing system on the aircraft.

In accordance with an advantageous embodiment, the expected measurement of the software on the device may be provided to the device from a trusted source when the software on the device is initially installed or replaced, when the software is updated, or both. Thus, the expected measurement of the software on the device may reflect the latest version of the software, including any updates to the software on the device. The expected measurement of the software includes a digital signature or other identifier to identify the source of the expected measurement. The actual measurement of the software on the device may be identified by the device when the device requests access to the network data processing system on an aircraft. The actual measurement may be identified and provided to the aircraft network data processing system using the Trusted Network Connect (TNC) approach to remote attestation using a Trusted Platform Module (TPM). The expected measurement and the actual measurement may then be provided from the device to a data processing system on the aircraft when the device requests access to the network data processing system on the aircraft.

The data processing system on the aircraft may check the digital signature for the expected measurement to determine whether the signature is correct for a trusted source. If the signature is correct, the data processing system may compare the actual measurement to the expected measurement. If the actual measurement matches the expected measurement, the data processing system on the aircraft may allow the device to access the network data processing system on the aircraft. If the digital signature for the expected measurement is determined not to be correct, or the actual measurement does not match the expected measurement, then the data processing system on the aircraft may not allow the device to access the aircraft network data processing system.

Turning now to FIG. 1, an illustration of a block diagram of an aircraft maintenance environment for maintaining an aircraft is depicted in accordance with an advantageous embodiment. In this example, aircraft maintenance environment 100 may include software suppliers 102. Software suppliers 102 provide software applications or other software for use on aircraft 104. Software suppliers 102 may include any entity that develops or otherwise supplies software for use on aircraft 104. For example, without limitation, software suppliers 102 may include aircraft manufacturer 106, aircraft operator 108, and third party software supplier 110.

Aircraft manufacturer 106 manufactures aircraft 104 and provides manufacturer software 112. Aircraft operator 108 operates aircraft 104 and provides aircraft operator software 114. Aircraft operator 108 may be, for example, without limitation, an airline, military organization, or any other private or government organization that operates aircraft 104. Third party software supplier 110 provides third party software 116. Manufacturer software 112, aircraft operator software 114, and third party software 116 may form parts of aircraft software 118 for use on aircraft 104.

Aircraft maintenance entity 120 in aircraft maintenance environment 100 may load aircraft software 118 on aircraft 104. Aircraft maintenance entity 120 may be any entity that is responsible for loading aircraft software 118 on aircraft 104. For example, aircraft maintenance entity 120 may include aircraft manufacturer 106 or aircraft operator 108 or both, or any combination of these or other entities. Aircraft maintenance entity 120 may or may not be the owner of aircraft 104. Aircraft maintenance entity 120 may include an entity acting on behalf of the owner of aircraft 104 to load aircraft software 118 on aircraft 104. In any case, it is assumed that aircraft maintenance entity 120 has authority to load aircraft software 118 on aircraft 104.

Aircraft 104 may be a commercial or private passenger aircraft, cargo aircraft, or a military or other government aircraft. Aircraft 104 may include aircraft network data processing system hardware 122. Aircraft software 118 may be loaded onto aircraft 104 in the form of software aircraft parts 124. Aircraft network data processing system hardware 122 and software aircraft parts 124 together define aircraft configuration 126. Software aircraft parts 124 may be loaded onto aircraft 104 by aircraft maintenance entity 120. Aircraft maintenance entity 120 may follow specified procedures for loading of software aircraft parts 124 on aircraft 104 so that aircraft configuration 126, including all software aircraft parts 124 currently installed on aircraft 104, is known.

Software aircraft parts 124 may be run on aircraft network data processing system hardware 122 to perform various operations. These operations may affect the performance or safety of aircraft 104. Operations performed using software that is not specifically designed for aircraft 104 or that is not certified for use on aircraft 104 may affect operations on aircraft 104 in an undesirable manner.

Aircraft maintenance entity 120 may maintain aircraft 104 using maintenance device 127. Aircraft maintenance entity 120 that loads aircraft software 118 on aircraft 104 may or may not be the same as aircraft maintenance entity 120 that maintains aircraft 104 using maintenance device 127. In any case, it is assumed that aircraft maintenance entity 120 has authority to access aircraft network data processing system hardware 122 using maintenance device 127 to perform maintenance operations on aircraft 104.

Maintenance device 127 may be a portable data processing device that is connected to aircraft network data processing system hardware 122 on aircraft 104 to perform various maintenance operations on aircraft 104. For example, without limitation, maintenance device 127 may be a laptop computer, other portable computer, or other type of portable data processing device that may be connected to aircraft network data processing system hardware 122.

Maintenance device 127 includes maintenance device software 128. Maintenance device software 128 may include software for controlling maintenance device 127 to perform various maintenance operations on aircraft 104, as well as other software. Maintenance device software 128 may include software that is provided from one or more of software suppliers 102. For example, maintenance device software 128 may include one or more of manufacturer software 112, aircraft operator software 114, or third party software 116.

Maintenance device software 128 may be changed by software updates from software suppliers 102. Changes to maintenance device software 128 by updates from software suppliers 102 that are trusted should not affect operations on aircraft 104 in an undesirable manner.

Maintenance device software 128 also may be changed in undesired ways. For example, maintenance device software 128 may become corrupted, infected, or otherwise changed in an undesired manner. In this case, such software may affect operations on aircraft 104 in an undesired manner when maintenance device 127 is connected to aircraft network data processing system hardware 122 on aircraft 104.

In accordance with an advantageous embodiment, it is determined whether or not maintenance device software 128 on maintenance device 127 is correct before maintenance device 127 is allowed to access aircraft network data processing system hardware 122 in a manner that may affect operation of aircraft 104. Maintenance device software 128 on maintenance device 127 is correct if maintenance device software 128, including any changes resulting from updates, is from software suppliers 102 that are authorized suppliers of maintenance device software 128. If it is determined that maintenance device software 128 on maintenance device 127 is correct, then maintenance device 127 is allowed to access aircraft network data processing system hardware 122. Maintenance device software 128 on maintenance device 127 is not correct if maintenance device software 128 is changed in any manner that is not approved by aircraft maintenance entity 120. If it is determined that maintenance device software 128 on maintenance device 127 is not correct, then maintenance device 127 is not allowed to access aircraft network data processing system hardware 122.

Figure 2:
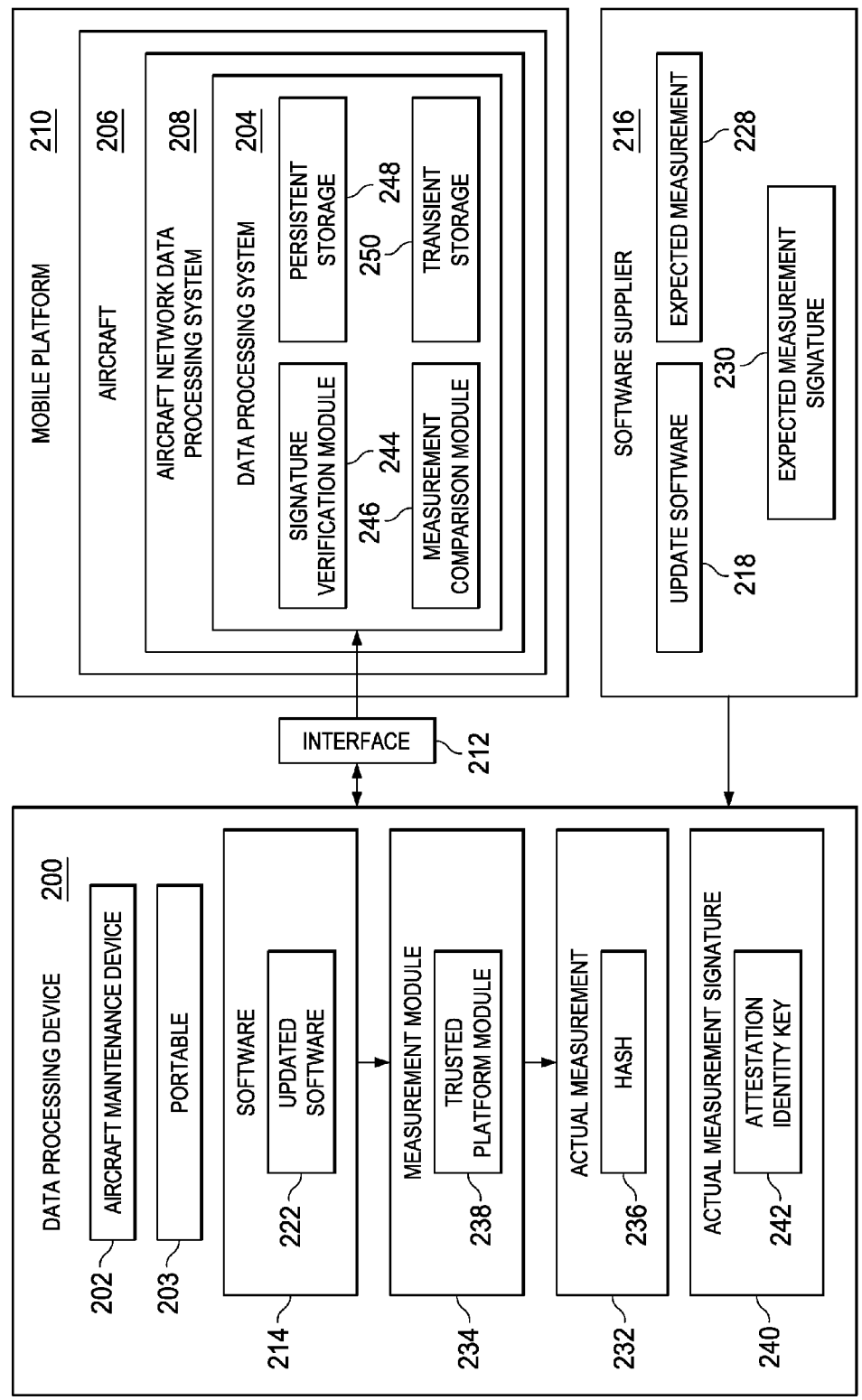
FIG. 2 is an illustration of a block diagram of a data processing device connected to a data processing system on an aircraft in accordance with an advantageous embodiment.

Turning now to FIG. 2, an illustration of a block diagram of a data processing device connected to a data processing system on an aircraft is depicted in accordance with an advantageous embodiment. Data processing device 200 may be aircraft maintenance device 202. In this example, data processing device 200 is an example of one implementation of maintenance device 127 in FIG. 1. Data processing device 200 may be portable 203. For example, without limitation, data processing device 200 may be a laptop computer, other portable computer, or other type of portable data processing device.

Data processing device 200 is configured to be connected to data processing system 204 in aircraft 206. Data processing system 204 may be part of aircraft network data processing system 208 in aircraft 206. For example, without limitation, aircraft network data processing system 208 may include a number of line-replaceable units. In this case, data processing system 204 may be a line-replaceable unit on aircraft 206. In this example, aircraft 206 is an example of one implementation of aircraft 104 in FIG. 1.

Aircraft 206 is one example of mobile platform 210 in which an advantageous embodiment may be implemented. Mobile platform 210 may be another type of vehicle or other mobile structure. For example, without limitation, mobile platform 210 may be an aerospace vehicle that is capable of traveling through the air, in space, or both. As another example, without limitation, mobile platform 210 may be a vehicle that is capable of travelling on land, on the surface of water, or under water. An advantageous embodiment also may be used for an embedded system that is often not connected to other networks.

Data processing device 200 is configured to be connected to data processing system 204 on aircraft 206 via interface 212. Interface 212 may be implemented in any manner appropriate for providing an exchange of data or information between data processing device 200 and data processing system 204 using any transmission medium and any protocol. Interface 212 may provide a physical connection, such as an electric wire or fiber optic connection. Alternatively, interface 212 may provide a wireless connection. Interface 212 may include hardware, software, or a combination of hardware and software operating together to provide the connection between data processing device 200 and data processing system 204. Interface 212 may be implemented, at least in part, as part of data processing device 200. For example, without limitation, interface 212 may provide an Ethernet or similar type of connection between data processing device 200 and data processing system 204 on aircraft 206.

Data processing device 200 includes software 214. Software 214 may be stored in any type of memory or in any other type of storage device that is part of or attached to data processing device 200. For example, without limitation, software 214 may include software for controlling data processing device 200 to perform a number of maintenance operations on aircraft 206. In this example, software 214 is an example of maintenance device software 128 in FIG. 1.

Software supplier 216 may provide update software 218 for data processing device 200. In this example, software supplier 216 is one example of software suppliers 102 in FIG. 1. Software supplier 216 is an authorized or approved supplier of update software 218 for data processing device 200. In this example, software supplier 216 also may be referred to as a trusted software supplier.

Update software 218 may be provided to data processing device 200 in any appropriate manner for providing software to a data processing device. For example, update software 218 may be provided to data processing device 200 via computer readable media. Such computer readable media may include computer readable storage media. Computer readable storage media may include, for example, without limitation, a magnetic or optical disk, or other portable memory or storage device that may be connected to data processing device 200. Alternatively, such computer readable media may include computer readable signal media. For example, without limitation, update software 218 may be provided to data processing device 200 via a physical or wireless connection to another data processing device or to a network of data processing devices.

Update software 218 is used to change software 214 in data processing device 200. Updated software 222 is software 214 in data processing device 200 after software 214 is changed by update software 218.

In accordance with an advantageous embodiment, expected measurement 228 and expected measurement signature 230 may be provided by software supplier 216 to data processing device 200 along with update software 218. Expected measurement 228 is a value that indicates an expected value for actual measurement 232 of updated software 222, including update software 218. Expected measurement 228 may be determined by any entity with knowledge of both update software 218 and software 214 on data processing device 200 before software 214 on data processing device 200 is updated by update software 218. With this knowledge, expected measurement 228 for updated software 222 can be determined in the same manner as actual measurement 232. For example, without limitation, expected measurement 228 may be determined by software supplier 216 that provides update software 218. Expected measurement 228 is determined outside of data processing device 200 and is provided to data processing device 200. Data processing device 200 receives expected measurement 228. Expected measurement 228 is not generated by data processing device 200.

Expected measurement signature 230 may be a digital signature that indicates the source of expected measurement 228. Expected measurement signature 230 may be used to determine whether expected measurement 228 is from a trusted or approved source before expected measurement 228 is used to determine whether data processing device 200 is allowed to access aircraft network data processing system 208 on aircraft 206.

Data processing device 200 includes measurement module 234. Measurement module 234 identifies actual measurement 232 of updated software 222. For example, without limitation, actual measurement 232 may be based on hash 236 of updated software 222. In this case, measurement module 234 may identify actual measurement 232 using any appropriate cryptographic or other known hash function or algorithm on updated software 222. As another example, measurement module 234 may identify actual measurement 232 using a combination of hash functions. In this case, hash 236 may be a hash of a hash. Measurement module 234 may identify actual measurement 232 using one or more hash functions or other functions that are initiated using a random number. Actual measurement 232 may be identified based on all or a portion of updated software 222.

Measurement module 234 may be implemented in software, in hardware, or using a combination of hardware and software. For example, without limitation, measurement module 234 may be implemented using Trusted Platform Module 238 based on standards from the Trusted Computing Group. Measurement module 234 may identify actual measurement 232 automatically at start-up of data processing device 200.

In accordance with an advantageous embodiment, data processing device 200 also may generate actual measurement signature 240. Actual measurement signature 240 may be a digital signature or similar information that indicates the source of actual measurement 232. Actual measurement signature 240 may be generated by measurement module 234 or by another module or function of data processing device 200. For example, without limitation, actual measurement signature 240 may include attestation identity key 242 as defined in the Trusted Network Connect architecture standard from the Trusted Computing Group. Actual measurement signature 240 may be used to determine whether actual measurement 232 is from a trusted or approved source before actual measurement 232 is used to determine whether data processing device 200 is allowed to access aircraft network data processing system 208 on aircraft 206.

In accordance with an advantageous embodiment, data processing device 200 may be connected to data processing system 204 on aircraft 206 via interface 212. Initially, access to aircraft network data processing system 208 on aircraft 206 by data processing device 200 may be prevented until it is determined whether data processing device 200 is allowed to access aircraft network data processing system 208. For purposes of the present application, including in the claims, the limited connectivity and interaction between data processing device 200 and data processing system 204 on aircraft 206 that is used to determine whether data processing device 200 is allowed to access aircraft network data processing system 208 on aircraft 206 is not considered "access". Until it is determined whether data processing device 200 is allowed to access aircraft network data processing system 208 on aircraft 206, connectivity and interaction between data processing device 200 and data processing system 204 on aircraft 206 is limited so that any undesired portion of software 214 on data processing device 200 cannot affect aircraft network data processing system 208 on aircraft 206 in any way.

Having established a connection between data processing device 200 and data processing system 204 on aircraft 206, data processing device 200 may request access to aircraft network data processing system 208 on aircraft 206. Before access is granted, data processing device 200 sends actual measurement 232, actual measurement signature 240, expected measurement 228, and expected measurement signature 230 to data processing system 204 on aircraft 206. This information may be sent to data processing system 204 from data processing device 200 along with the request to access aircraft network data processing system 208. Alternatively, this information may be sent to data processing system 204 from data processing device 200 in response to a request for such information that is sent from data processing system 204 on aircraft 206 to data processing device 200 in response to data processing system 204 receiving the request to access aircraft network data processing system 208 from data processing device 200.

In accordance with an advantageous embodiment, data processing system 204 on aircraft 206 uses actual measurement 232, actual measurement signature 240, expected measurement 228, and expected measurement signature 230 to determine whether data processing device 200 is allowed to access aircraft network data processing system 208.

Data processing system 204 on aircraft 206 may include signature verification module 244. Signature verification module 244 may be configured to determine, in any appropriate manner, whether actual measurement signature 240 and expected measurement signature 230 are correct. Actual measurement signature 240 is correct if actual measurement signature 240 indicates that actual measurement 232 is from a trusted or approved source. Expected measurement signature 230 is correct if expected measurement signature 230 indicates that expected measurement 228 is from a trusted or approved source.

If signature verification module 244 determines that both actual measurement signature 240 and expected measurement signature 230 are correct, then actual measurement 232 may be compared to expected measurement 228 to determine whether data processing device 200 is allowed to access aircraft network data processing system 208. If signature verification module 244 determines that either actual measurement signature 240 or expected measurement signature 230 is not correct, then data processing device 200 may not be allowed to access aircraft network data processing system 208 on aircraft 206.

Data processing system 204 on aircraft 206 also may include measurement comparison module 246. Measurement comparison module 246 may be configured to compare actual measurement 232 to expected measurement 228. If measurement comparison module 246 determines that actual measurement 232 matches expected measurement 228, then data processing device 200 may be allowed to access aircraft network data processing system 208 on aircraft 206. If measurement comparison module 246 determines that actual measurement 232 does not match expected measurement 228, then data processing device 200 may not be allowed to access aircraft network data processing system 208 on aircraft 206.

Aircraft network data processing system 208 may include persistent storage 248 and transient storage 250. For example, without limitation, persistent storage 248 may be a disk or other persistent storage device or devices on aircraft network data processing system 208. Transient storage 250 also may be referred to as memory, temporary storage, or temporary memory. For example, without limitation, transient storage 250 may include memory or other non-persistent storage associated with a processor unit on aircraft network data processing system 208. Transient storage 250 also may include memory that has been temporarily swapped out to a swap partition on persistent storage 248. Therefore, transient storage 250 need not be limited to the size of physical memory. Software and other data in transient storage 250 are lost when aircraft network data processing system 208 is shut down.

Software and other data loaded in persistent storage 248 may be subject to the procedures that are followed during loading of a software aircraft part on an aircraft so that the current configuration of the aircraft is always known. In accordance with an advantageous embodiment, the information used to determine whether data processing device 200 is allowed to access aircraft network data processing system 208 on aircraft 206, including expected measurement 228, may be received from data processing device 200 at the time that the access to aircraft network data processing system 208 is requested. Expected measurement 228 may only be stored temporarily in transient storage 250 while it is determined by data processing system 204 on aircraft 206 whether data processing device 200 may access aircraft network data processing system 208. Since expected measurement 228 is not stored in persistent storage 248, expected measurement 228 is not a part of the configuration of aircraft 206. Therefore, changes to expected measurement 228, resulting from update software 218 provided to data processing device 200, need not result in changes to the configuration of aircraft 206 and thus need not be handled subject to the procedures that are followed during the loading of software aircraft parts on an aircraft.

The illustration of FIG. 2 is not meant to imply physical or architectural limitations to the manner in which different advantageous embodiments may be implemented. Other components in addition to, in place of, or both in addition to and in place of the ones illustrated may be used. Some components may be unnecessary in some advantageous embodiments. Also, the blocks are presented to illustrate some functional components. One or more of these blocks may be combined or divided into different blocks when implemented in different advantageous embodiments.

For example, a system and method for verifying the integrity of a data processing device connected to a data processing system on an aircraft, as described herein, also may be used for verifying integrity between other data processing devices and systems on an aircraft or other mobile platform. For example, without limitation, a system and method in accordance with an advantageous embodiment may be used to cross check integrity between line-replaceable units on an aircraft. As another example, the system and method, as described herein, may be used by a data processing system on an aircraft to verify the integrity of a ground system configuration to which the data processing system on the aircraft is connected. In general, the system and method as described herein may be used in any network of embedded systems. For example, without limitation, the system and method as described herein may be used to cross check integrity between computers or other data processing devices in a supervisory control and data acquisition system.

Figure 3:
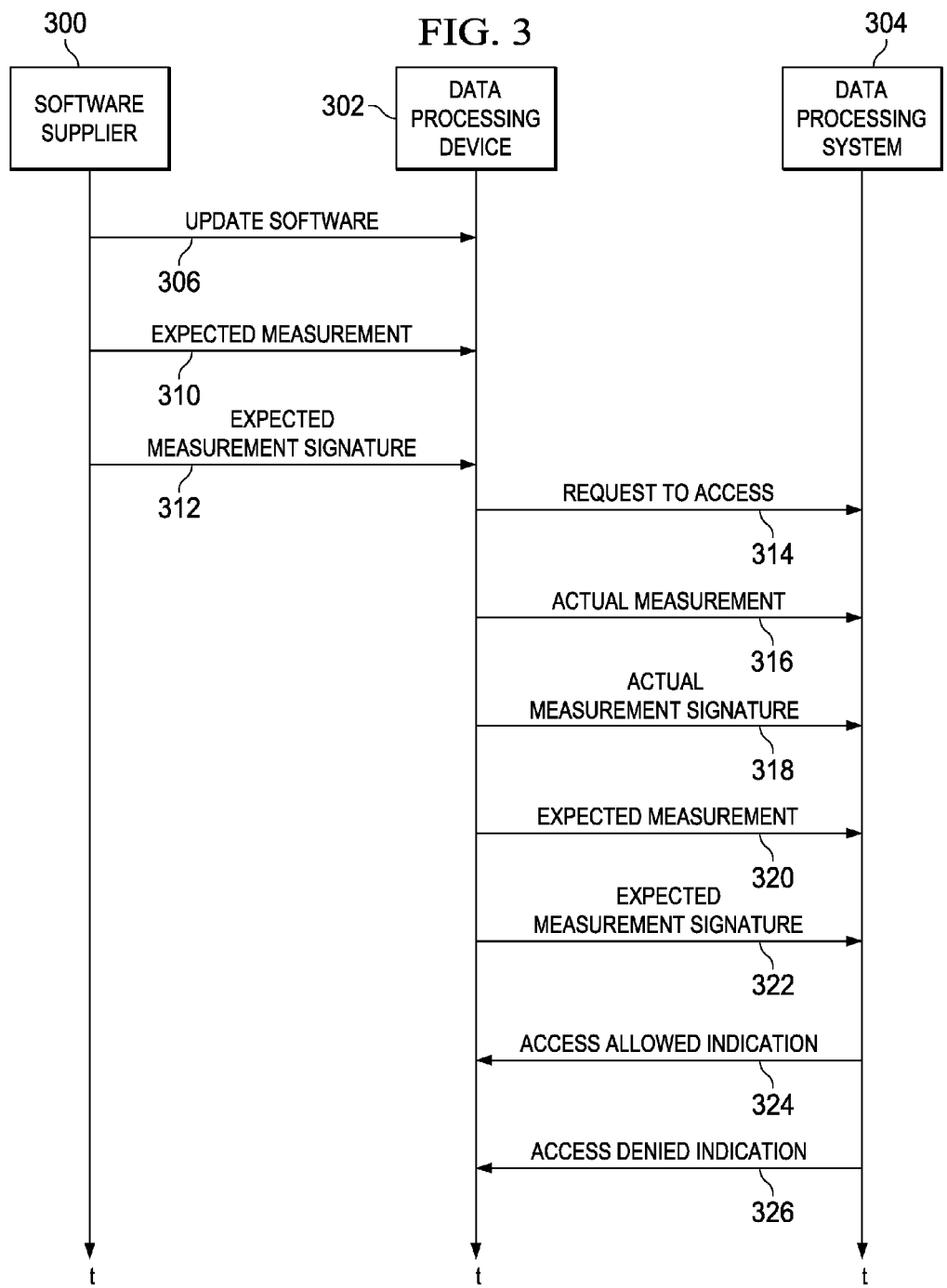
FIG. 3 is an illustration of information transfer for a data processing device connected to a data processing system on an aircraft in accordance with an advantageous embodiment.

Turning now to FIG. 3, an illustration of information transfer for a data processing device connected to a data processing system on an aircraft is depicted in accordance with an advantageous embodiment. FIG. 3 illustrates information transfer from software supplier 300 to data processing device 302 to install software on data processing device 302. In this example, the software to be installed on data processing device 302 is update software 306. However, the information transfer illustrated and described may apply to any software installation on data processing device 302, including an initial installation or re-installation of all or of substantially all of the software on the device. FIG. 3 also illustrates information transfer between data processing device 302 and data processing system 304 when data processing device 302 attempts to access data processing system 304 after the software on data processing device 302 is updated. In this example, software supplier 300 is an example of software suppliers 102 in FIG. 1 and of software supplier 216 in FIG. 2. In this example, data processing device 302 is an example of data processing device 200 in FIG. 2. Additionally, data processing system 304 is an example of data processing system 204 on aircraft 206 in FIG. 2.

When the software on data processing device 302 is to be updated, software supplier 300 provides update software 306, expected measurement 310, and expected measurement signature 312 to data processing device 302. The software on data processing device 302 is changed with update software 306. Expected measurement 310 is the expected measurement of the software on data processing device 302 after the software on data processing device 302 is changed with update software 306. Expected measurement signature 312 indicates that expected measurement 310 is from a trusted source.

Data processing device 302 may send request to access 314, actual measurement 316, actual measurement signature 318, expected measurement 320, and expected measurement signature 322 to data processing system 304. Actual measurement 316 is the measurement of the software on data processing device 302 as identified by data processing device 302. Identifying actual measurement 316 may include providing some data from data processing system 304 to data processing device 302 to avoid replay attacks. Actual measurement signature 318 indicates that actual measurement 316 is from a trusted source.

Data processing system 304 determines if actual measurement signature 318 and expected measurement signature 322 are correct. If both actual measurement signature 318 and expected measurement signature 322 are correct, then data processing system 304 compares actual measurement 316 to expected measurement 320. If actual measurement 316 matches expected measurement 320, then data processing system 304 may send access allowed indication 324 back to data processing device 302. If actual measurement 316 does not match expected measurement 320, then data processing system 304 sends access denied indication 326 back to data processing device 302. Data processing system 304 also may send access denied indication 326 back to data processing device 302 if either actual measurement signature 318 or expected measurement signature 322 is not correct.

Figure 4:
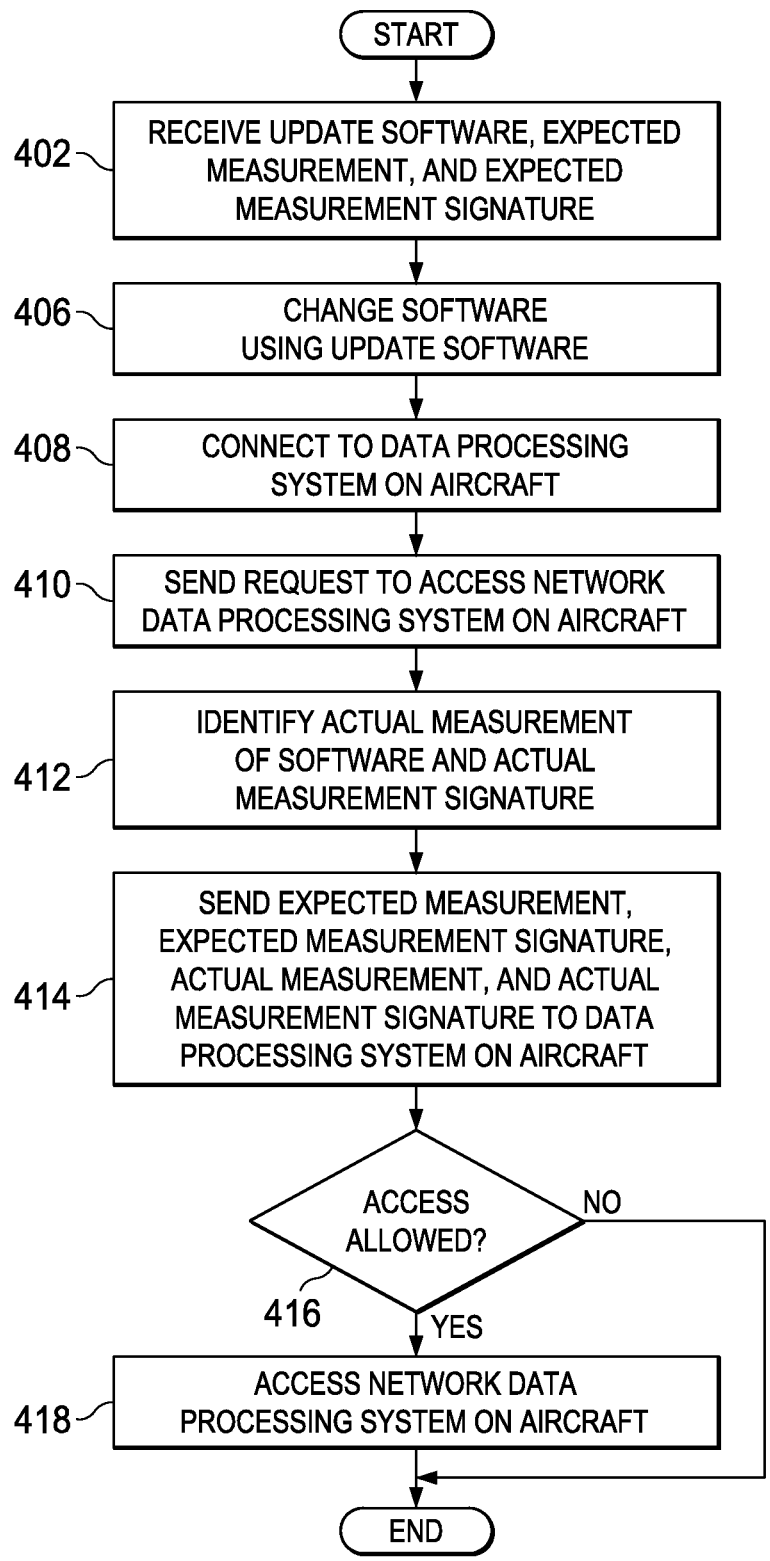
FIG. 4 is an illustration of a flowchart of a process for accessing a network data processing system on an aircraft by a data processing device with updated software in accordance with an advantageous embodiment.

Turning now to FIG. 4, an illustration of a flowchart of a process for accessing a network data processing system on an aircraft by a data processing device with updated software is depicted in accordance with an advantageous embodiment.

For example, the process of FIG. 4 may be performed by data processing device 200 in FIG. 2.

The data processing device to be updated may receive update software, an expected measurement, and an expected measurement signature (operation 402). The software on the data processing device is changed using the update software (operation 406).

The data processing device then may be connected to a data processing system on an aircraft (operation 408). The data processing device may send a request to the data processing system to access a network data processing system on the aircraft (operation 410). The data processing device may identify an actual measurement of the software on the device and an actual measurement signature (operation 412). The actual measurement may be generated at start-up of the device. Additional measuring processes may also occur after the device has booted. The data processing device then may send the expected measurement, the expected measurement signature, the actual measurement, and the actual measurement signature to the data processing system on the aircraft (operation 414) to determine whether access to the network data processing system on the aircraft will be allowed.

It is then determined whether the data processing system on the aircraft has indicated that the data processing device is allowed to access the aircraft network data processing system (operation 416). If it is determined at operation 416 that access to the aircraft network data processing system is not allowed, the process terminates. If it is determined at operation 416 that access to the aircraft network data processing system is allowed, the data processing device accesses the network data processing system on the aircraft (operation 418) with the process terminating thereafter.

Figure 5:
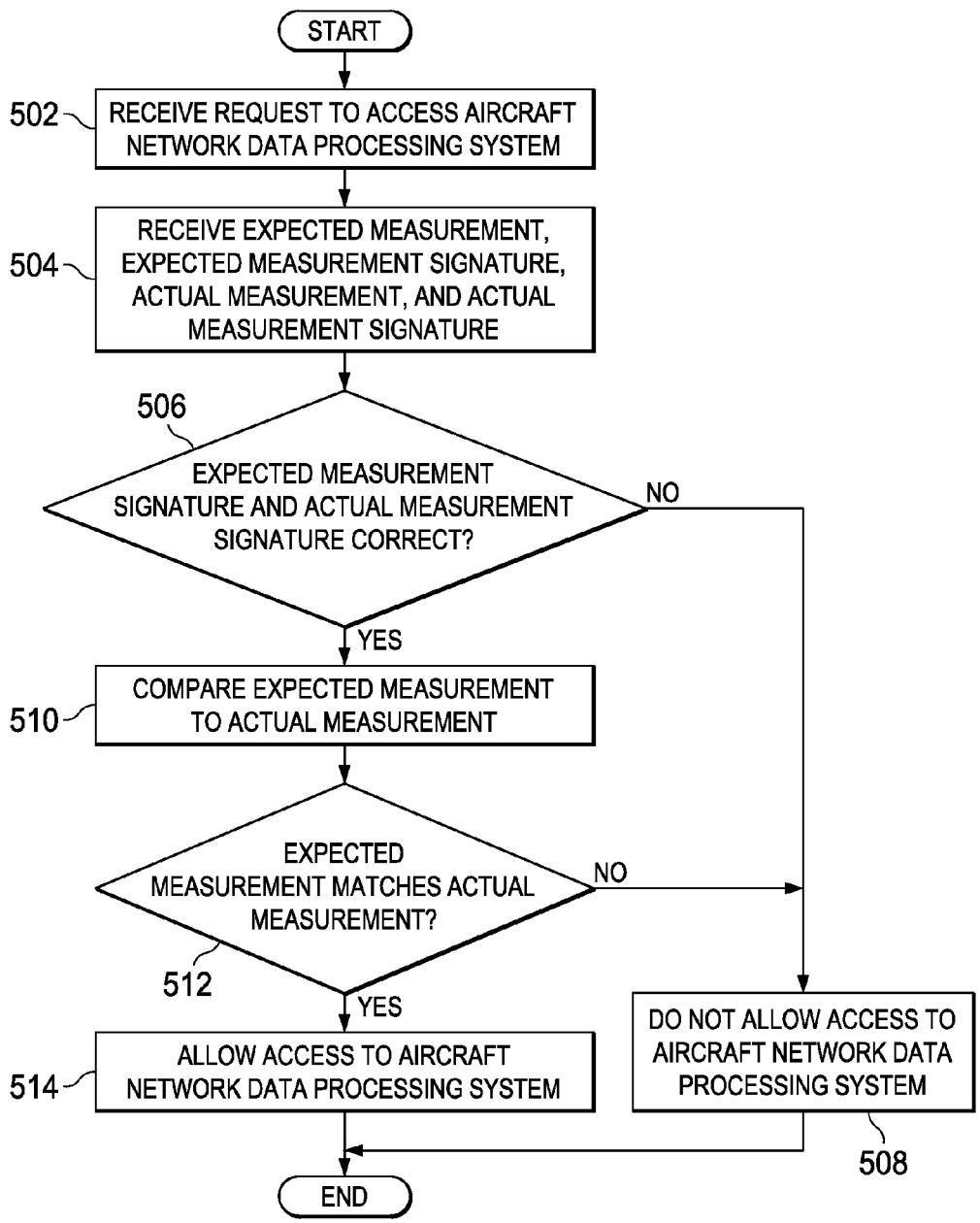
FIG. 5 is an illustration of a flowchart of a process for verifying a data processing device requesting access to a data processing system on an aircraft in accordance with an advantageous embodiment.

Turning now to FIG. 5, an illustration of a flowchart of a process for verifying a data processing device requesting access to a data processing system on an aircraft is depicted in accordance with an advantageous embodiment. For example, the process of FIG. 5 may be performed by data processing system 204 on aircraft 206 in FIG. 2.

The process begins when the data processing system on the aircraft receives a request from a data processing device to access the aircraft network data processing system (operation 502). The data processing system on the aircraft receives an expected measurement, expected measurement signature, actual measurement, and actual measurement signature from the data processing device requesting access (operation 504). The data processing system on the aircraft then determines if both the expected measurement signature and the actual measurement signature are correct (operation 506). If it is determined at operation 506 that either the expected measurement signature or the actual measurement signature is not correct, the data processing system on the aircraft does not allow the data processing device to access the aircraft network data processing system (operation 508) with the process terminating thereafter.

If it is determined at operation 506 that both the expected measurement signature and the actual measurement signature are correct, the data processing system on the aircraft compares the expected measurement to the actual measurement (operation 510). Based on the comparison performed in operation 510 it is determined whether the expected measurement matches the actual measurement (operation 512). If it is determined at operation 512 that the expected measurement matches the actual measurement, the data processing device is allowed to access the aircraft network data processing system (operation 514) with the process terminating thereafter. If it is determined at operation 512 that the expected measurement does not match the actual measurement, the process proceeds to operation 508 as described above, with the process terminating thereafter.

Turning now to FIG. 6, an illustration of a data processing system is depicted in accordance with an advantageous embodiment. In this example, data processing system 600 is an example of one implementation of data processing device 200 in FIG. 2. Data processing system 600 also is an example of one implementation of data processing system 204 in FIG. 2. In this illustrative example, data processing system 600 includes communications fabric 602. Communications fabric 602 provides communications between processor unit 604, memory 606, persistent storage 608, communications unit 610, input/output (I/O) unit 612, and display 614. Memory 606, persistent storage 608, communications unit 610, input/output (I/O) unit 612, and display 614 are examples of resources accessible by processor unit 604 via communications fabric 602.

Processor unit 604 serves to run instructions for software that may be loaded into memory 606. Processor unit 604 may be a number of processors, a multi-processor core, or some other type of processor, depending on the particular implementation. Further, processor unit 604 may be implemented using a number of heterogeneous processor systems in which a main processor is present with secondary processors on a single chip. As another advantageous example, processor unit 604 may be a symmetric multi-processor system containing multiple processors of the same type.

Memory 606 and persistent storage 608 are examples of storage devices 616. A storage device is any piece of hardware that is capable of storing information such as, for example, without limitation, data, program code in functional form, and/or other suitable information either on a temporary basis and/or a permanent basis. Storage devices 616 may also be referred to as computer readable storage devices in these examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output unit 612 allows for input and output of data with other devices that may be connected to data processing system 600. For example, input/output unit 612 may provide a connection for user input through a keyboard, a mouse, and/or some other suitable input device. Further, input/output unit 612 may send output to a printer. Display 614 provides a mechanism to display information to a user.

Instructions for the operating system, applications, and/or programs may be located in storage devices 616, which are in communication with processor unit 604 through communications fabric 602. In these advantageous examples, the instructions are in a functional form on persistent storage 608. These instructions may be loaded into memory 606 for execution by processor unit 604. The processes of the different embodiments may be performed by processor unit 604 using computer-implemented instructions, which may be located in a memory, such as memory 606.

These instructions are referred to as program instructions, program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Program code 618 and computer readable media 620 form computer program product 622 in these examples. In one example, computer readable media 620 may be computer readable storage media 624 or computer readable signal media 626.

Computer readable storage media 624 may include, for example, an optical or magnetic disk that is inserted or placed into a drive or other device that is part of persistent storage 608 for transfer onto a storage device, such as a hard drive, that is part of persistent storage 608. Computer readable storage media 624 also may take the form of a persistent storage, such as a hard drive, a thumb drive, or a flash memory, that is connected to data processing system 600. In some instances, computer readable storage media 624 may not be removable from data processing system 600.

In these examples, computer readable storage media 624 is a physical or tangible storage device used to store program code 618 rather than a medium that propagates or transmits program code 618. Computer readable storage media 624 is also referred to as a computer readable tangible storage device or a computer readable physical storage device. In other words, computer readable storage media 624 is a media that can be touched by a person.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, or any other suitable type of signal. These signals may be transmitted over communications links, such as wireless communications links, optical fiber cable, coaxial cable, a wire, or any other suitable type of communications link. In other words, the communications link or the connection may be physical or wireless in the illustrative examples.

In some advantageous embodiments, program code 618 may be downloaded over a network to persistent storage 608 from another device or data processing system through computer readable signal media 626 for use within data processing system 600. For instance, program code stored in a computer readable storage medium in a server data processing system may be downloaded over a network from the server to data processing system 600. The data processing system providing program code 618 may be a server computer, a client computer, or some other device capable of storing and transmitting program code 618.

The different components illustrated for data processing system 600 are not meant to provide architectural limitations to the manner in which different embodiments may be implemented. The different advantageous embodiments may be implemented in a data processing system including components in addition to and/or in place of those illustrated for data processing system 600. Other components shown in FIG. 6 can be varied from the illustrative examples shown. The different embodiments may be implemented using any hardware device or system capable of running program code. As one example, data processing system 600 may include organic components integrated with inorganic components and/or may be comprised entirely of organic components excluding a human being. For example, a storage device may be comprised of an organic semiconductor.

In another advantageous example, processor unit 604 may take the form of a hardware unit that has circuits that are manufactured or configured for a particular use. This type of hardware may perform operations without needing program code to be loaded into a memory from a storage device to be configured to perform the operations.

For example, when processor unit 604 takes the form of a hardware unit, processor unit 604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 618 may be omitted, because the processes for the different embodiments are implemented in a hardware unit.

In still another illustrative example, processor unit 604 may be implemented using a combination of processors found in computers and hardware units. Processor unit 604 may have a number of hardware units and a number of processors that are configured to run program code 618. With this depicted example, some of the processes may be implemented in the number of hardware units, while other processes may be implemented in the number of processors.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system.

Additionally, communications unit 610 may include a number of devices that transmit data, receive data, or transmit and receive data. Communications unit 610 may be, for example, a modem or a network adapter, two network adapters, or some combination thereof. Further, a memory may be, for example, memory 606, or a cache, such as found in an interface and memory controller hub that may be present in communications fabric 602.

The description of the different advantageous embodiments has been presented for purposes of illustration and description and is not intended to be exhaustive or to limit the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for accessing an aircraft network data processing system, comprising:
   receiving, by a first data processing device, an expected value from a hash function on the first data processing device that reflects updates to software on the first data processing device, wherein the expected value is generated by a second device other than the first data processing device;
   receiving, by the first data processing device, a first digital signature from the second device indicating a first source of the expected value;
   generating, by the first data processing device, an actual value from the hash function that reflects the updates to the software;
   generating on the first data processing device a second digital signature that indicates a second source of the actual value;
   connecting the first data processing device to the aircraft network data processing system on an aircraft through an interface, wherein the first data processing device is separate from the data processing system on the aircraft;
   sending the expected value and the actual value from the first data processing device to the aircraft network data processing system;
   sending the first digital signature and the second digital signature from first the data processing device to the aircraft network data processing system;
   comparing, by the aircraft network data processing system, the expected value to the actual value to determine whether the first data processing device is allowed to access the aircraft network data processing system;
   determining on the aircraft network data processing system whether the first digital signature and the second digital signature are from trusted or approved sources as an additional step in determining whether the first data processing device is allowed to access the aircraft network data processing system; and
   accessing the aircraft network data processing system by the first data processing device in response to a determination that the first data processing device is allowed to access the aircraft network data processing system.

2. The method of claim 1 further comprising:
   receiving, by the first data processing device, the updates to the software, from the second device, wherein the first data processing device is a portable device;
   changing the software on the first data processing device by using the updates to the software to form updated software and
   loading the updated software from the first data processing device into the aircraft network data processing system.

3. The method of claim 2, wherein generating, by the first data processing device, the actual value from the hash function comprises identifying at least one hash of the updated software on the first data processing device.

4. The method of claim 1, wherein generating, by the first data processing device, the actual value from the hash function comprises generating the actual value from the hash function using a trusted platform module in the first data processing device.

5. The method of claim 1, wherein the first data processing device is portable.

6. The method of claim 1, wherein the first data processing device is an aircraft maintenance device.

7. A method for allowing access to an aircraft network data processing system, comprising:
   connecting a portable data processing device to the aircraft network data processing system through an interface;
   receiving, from the portable data processing device by the aircraft network data processing system on an aircraft, an expected value from a hash function on the portable data processing device that reflects updates to software on the portable data processing device, wherein the expected value is generated by a device other than the portable data processing device and the portable data processing device is a separate device from the aircraft network data processing system;
   receiving, by the aircraft network data processing system, a first digital signature from the portable data processing device indicating a first source of the expected value;
   generating on the portable data processing device an actual value from the hash function that reflects the updates to the software;
   generating on the portable data processing device a second digital signature that indicates a second source of the actual value;
   receiving, from the portable data processing device by the aircraft network data processing system, the actual value;
   comparing, by the aircraft network data processing system on the aircraft, the expected value to the actual value;
   determining, by the aircraft network data processing system, whether the second digital signature and the first digital signature are from trusted or approved sources; and
   allowing the portable data processing device to access the aircraft network data processing system responsive to a determination that the expected value matches the actual value and that the first digital signature and the second digital signature are from trusted or approved sources.

8. The method of claim 7, wherein the expected value is not a part of a configuration of the aircraft.

9. The method of claim 7, wherein generating on the portable data processing device the actual value from the hash function comprises:
   changing the software on the portable data processing device by using the updates to the software to form updated software; and
   identifying at least one hash of the updated software on the portable data processing device.

10. The method of claim 7, wherein the data processing device is an aircraft maintenance device.

11. An apparatus comprising:
    an interface configured to connect the apparatus to an aircraft network data processing system on an aircraft, the apparatus being portable, the apparatus is separate from the aircraft network data processing system;
    software stored on the apparatus, the software and updates to the software provided by a provider distinct from the apparatus and the aircraft network data processing system;
    a measurement module configured to identify an actual value from a hash function on the apparatus that reflects the updates to the software stored on the apparatus; and
    a processor unit configured to receive an expected value from the provider for the hash function on the apparatus that reflects the updates to the software stored on the apparatus and to receive a first digital signature from the provider indicating a first source of the expected value is the provider, wherein the expected value is generated by the provider, and further configured to generate a second digital signature that indicates a second source of the actual value, send the expected value, the actual value, the first digital signature and the second digital signature from the apparatus to the aircraft network data processing system to determine whether the apparatus is allowed to access the aircraft network data processing system, and to access the aircraft network data processing system responsive to a determination that the apparatus is allowed to access the aircraft network data processing system.

12. The apparatus of claim 11, wherein:
the processor unit is further configured to receive the updates to the software and to change the software stored on the apparatus using the updates.

13. The apparatus of claim 11, wherein the measurement module comprises a trusted platform module.

14. The method of claim 1, wherein the expected value is saved temporarily in transient storage of the aircraft network data processing system.

15. The apparatus of claim 11, wherein the software comprises an operating system for the apparatus.

16. The method of claim 1, wherein the software comprises an operating system for the first data processing device and the software comprises substantially all of the software on the first data processing device.

* * * * *